United States Patent
Olavarría Rodríguez-Arango et al.

(10) Patent No.: US 9,086,058 B2
(45) Date of Patent: Jul. 21, 2015

(54) METHOD FOR THE NATURAL-DRAUGHT COOLING OF A SOLAR CONCENTRATION PLANT

(75) Inventors: Rafael Olavarría Rodríguez-Arango, Seville (ES); Elena García Ramírez, Seville (ES); José Barragán Jiménez, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 0 days.

(21) Appl. No.: 13/378,424
(22) PCT Filed: Jun. 18, 2010
(86) PCT No.: PCT/ES2010/000270
§ 371 (c)(1), (2), (4) Date: Feb. 12, 2012
(87) PCT Pub. No.: WO2010/146202
PCT Pub. Date: Dec. 23, 2010

(65) Prior Publication Data
US 2012/0132403 A1    May 31, 2012

(30) Foreign Application Priority Data
Jun. 19, 2009 (ES) .................................. 200901459

(51) Int. Cl.
*F28D 15/02* (2006.01)
*F03G 6/06* (2006.01)
(Continued)

(52) U.S. Cl.
CPC *F03G 6/06* (2013.01); *F03G 6/003* (2013.01); *F03G 6/045* (2013.01); *F03G 6/065* (2013.01); *Y02E 10/465* (2013.01)

(58) Field of Classification Search
CPC ................ F25B 29/00; F03G 6/00; F24J 2/10
USPC .................................... 60/641.8–641.15, 527
See application file for complete search history.

(56) References Cited

U.S. PATENT DOCUMENTS 3,987,845 A * 10/1976 Potthoff et al. ............... 165/129
4,289,114 A * 9/1981 Zadiraka ....................... 126/587
(Continued)

FOREIGN PATENT DOCUMENTS

DE    2945969    5/1981
DE    10248068   5/2004
(Continued)

OTHER PUBLICATIONS

Torres, T. et al. "Cooling Systems for Thermoelectric Plants", Informacion Tecnologica, 2003, vol. 14, No. 2, p. 36-38. English Abstract provided.
(Continued)

*Primary Examiner* — Kenneth Bomberg
*Assistant Examiner* — Shafiq Mian
(74) *Attorney, Agent, or Firm* — Kilpatrick Townsend & Stockton LLP

(57) ABSTRACT

Method for the natural-draught cooling of a high-concentration thermoelectric solar plant that includes a central receiver or tower with a heliostat field, wherein the tower is used as a natural-draught cooling tower. The steam originating from the turbine will be made to circulate through a series of condensers located at the base of the tower, where said condensers condense the steam therein and discharge the condensation heat to the atmosphere. The fluid responsible for this heat exchange is the air at ambient temperature at the base of the tower. Once condensed, the steam is pumped back towards the receiver so that it can be re-used as a heat-transfer fluid. The cooling air travels up through the tower and exits through the highest part thereof. The plant can be used to reduce not only its own electricity consumption, but also water consumption.

5 Claims, 1 Drawing Sheet

(51) Int. Cl.
    *F03G 6/00*     (2006.01)
    *F03G 6/04*     (2006.01)

(56) References Cited

U.S. PATENT DOCUMENTS

| | | | |
|---|---|---|---|
| 4,394,859 | A | 7/1983 | Drost |
| 4,421,102 | A | 12/1983 | Posnansky et al. |
| 4,485,803 | A * | 12/1984 | Wiener .................. 126/591 |
| 4,506,508 | A * | 3/1985 | Coers et al. ............... 60/652 |
| 4,608,964 | A * | 9/1986 | Russo .................... 126/688 |
| 5,395,598 | A * | 3/1995 | Prueitt ................... 422/168 |
| 5,417,052 | A * | 5/1995 | Bharathan et al. ........... 60/783 |
| 6,590,300 | B1 * | 7/2003 | Preito Santiago ........... 290/55 |
| 6,668,555 | B1 * | 12/2003 | Moriarty .................. 60/641.8 |
| 6,899,097 | B1 * | 5/2005 | Mecham ................. 126/591 |
| 6,981,377 | B2 | 1/2006 | Vaynberg et al. |
| 8,181,641 | B2 * | 5/2012 | Gonzalez et al. ........... 126/640 |
| 2006/0151154 | A1 * | 7/2006 | Szabo .................... 165/112 |
| 2008/0127647 | A1 | 6/2008 | Leitner |
| 2008/0302314 | A1 | 12/2008 | Gonzalez et al. |
| 2009/0121495 | A1 | 5/2009 | Mills |
| 2009/0320828 | A1 | 12/2009 | Koketsu et al. |
| 2009/0322089 | A1 | 12/2009 | Mills et al. |
| 2010/0071869 | A1 * | 3/2010 | Lovisa .................... 165/48.2 |
| 2010/0191378 | A1 | 7/2010 | Gilon et al. |
| 2012/0125000 | A1 * | 5/2012 | Olavarria Rodriguez-Arango et al. ............... 60/641.11 |

FOREIGN PATENT DOCUMENTS

| | | |
|---|---|---|
| EP | 2000669 A2 | 12/2008 |
| ES | 2222838 | 2/2005 |
| JP | 55142979 A | 11/1980 |
| WO | 2007073008 A2 | 6/2007 |
| WO | WO 2007104080 A1 * | 9/2007 |
| WO | 2008153922 | 12/2008 |

OTHER PUBLICATIONS

International Preliminary Report on Patentability of PCT/ES2010/000270 issued on Aug. 2, 2011, 10 pages. Translation included.

* cited by examiner

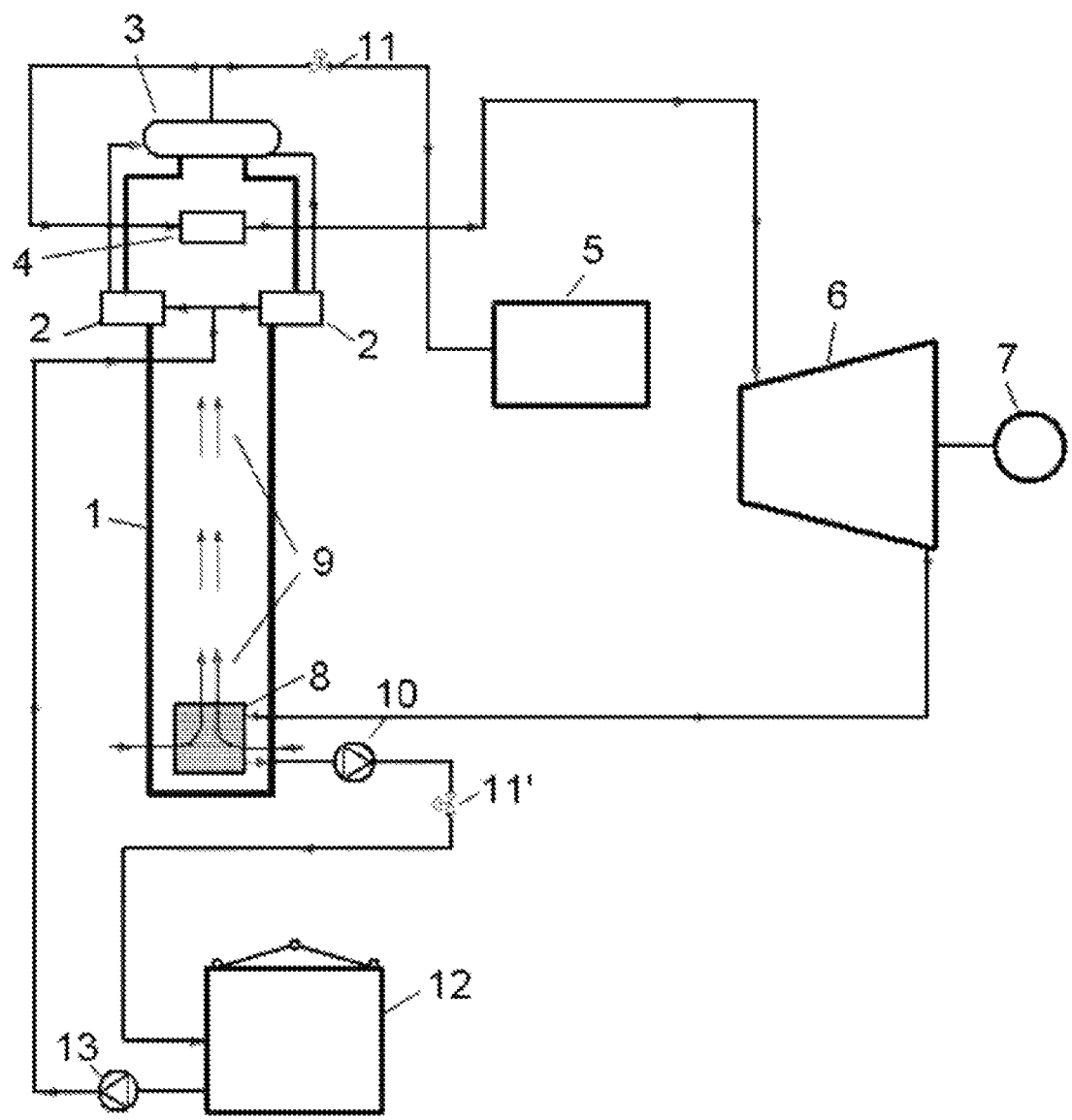

a solar concentration plant placed on tower technology.

METHOD FOR THE NATURAL-DRAUGHT COOLING OF A SOLAR CONCENTRATION PLANT

TECHNICAL FIELD OF THE INVENTION

The present invention relates to a method for the natural-draught cooling of the steam originating from the turbine of a solar concentration plant placed on tower technology.

BACKGROUND OF THE INVENTION

Within high solar concentration plants we can distinguish Stirling disks, parabolic trough collectors and the technology discussed herein, central receiver technology.

Central receiver systems consist of a heliostat field, made up of mirrors with a large surface area (40-125 $m^2$ per unit) called sun-tracking heliostats, which reflect the direct solar radiation incident upon one or several central receiver devices installed on the highest part of a very high tower. These receiver devices are usually found housed in cavities "excavated" in the tower itself.

Concentrated solar radiation heats a fluid inside the receiver, the thermal energy of which can subsequently be used to generate electricity.

At present, water/steam technology is that most frequently used in central receiver systems, using both saturated and superheated steam as a heat-transfer fluid.

Therefore, these types of thermoelectric solar energy tower plants require a location with guaranteed availability of two resources: high solar irradiance and sufficient water supply. In general, those areas with high irradiance indices are areas where water supply is limited. To this end, in the search for more efficient plants with solar receiver devices with the least possible water consumption, the envisaged invention is intended for recirculating and saving the greatest possible amount of water with the lowest possible in-plant electricity consumption.

At present, conventional thermal power generation plants operate in the following manner: the heliostats reflect the solar radiation towards the receiver devices installed on the highest part of the tower, whereupon said energy evaporates a fluid and the steam is pumped towards a turbine to produce electricity and, at the outlet of said turbine, water is recovered from the steam, which is still at a high temperature. To this end, the steam that exits the turbine is redirected towards a condenser. Mains water circulates through said condenser at a temperature lower than that of the steam, in such a manner that the steam releases its heat into the mains water, condensing and enabling pumping thereof in order to re-circulate it back towards the receiver device.

The mains water that circulates through the condenser to cool the steam flows out at a temperature higher than that at which it flowed thereinto. In order to re-use this water in the condenser circuit, we must lower the temperature thereof. To this end, cooling towers are used wherein circulation is forced by means of large fans which allow the circulation of air and heat exchange between said air and water. The temperature of the hot water coming from the condensation circuit is lowered in these cooling towers by transferring heat and matter to the air circulating therein.

A heat transfer medium called "fill pack" is used to improve the air/water contact. Water enters the tower through the upper part thereof and is evenly distributed over the fill pack using sprays. In this manner, optimum contact between water and atmospheric air is achieved.

The fill pack serves to increase water/air exchange time and surface area. Once the water/air contact has been achieved, heat from the water is released into the air. This is due to two mechanisms: heat transfer by convection and water-to-air steam transfer, with the consequent cooling of the water by evaporation.

In heat transfer by convection, heat flows towards the air that surrounds the water due to the difference in temperature between the two fluids.

The evaporation cooling rate is significant in cooling towers, approximately 90% being due to the diffusion phenomenon. When air comes into contact with water, a thin film of saturated moist air is formed on the film of water that descends through the fill pack. This is due to the fact that partial water vapour pressure on the film of air is greater than that of the moist air that circulates through the tower, whereupon water vapour is released (evaporation). This body of evaporated water extracts latent vaporisation heat from the liquid itself. Said latent heat is released into the air, cooling the water and raising air temperature.

These previously envisaged systems have several drawbacks such as the electricity consumption generated by the use of fans in the cooling towers and the high degree of water consumption required.

In order to reduce electricity consumption in conventional thermal plants, so-called natural-draught or hyperbolic draught cooling is used.

The air flowing through the natural-draught tower is mainly due to the difference in density between the cold inflowing air and warm outflowing air. The air expelled by the column is lighter than the ambient air and a draught is created by means of the chimney effect, thereby eliminating the need for mechanical fans.

The difference in speeds between the wind circulating at ground level and the wind circulating through the highest part of the chimney also help to establish the air flow. For both reasons, natural-draught towers must be high and must also have a large cross-section to facilitate the movement of ascendant air. These towers have low maintenance costs and are highly recommended for cooling large quantities of water. The average speed of the air flowing through the tower is usually comprised between 1-2 m/s. In these types of natural-draught towers, highly compact "fill packs" are not used, due to the fact that airflow resistance must be as small as possible.

As mentioned earlier, these towers are commonly used in thermal plants, where tower construction requires considerable investment but is compensated with less electricity consumption.

With regard to water consumption, it cannot be reduced, due to which these types of plants are normally located in areas with a guaranteed water supply.

DESCRIPTION OF THE INVENTION

The invention being proposed is a method for cooling a high-concentration thermoelectric solar plant having a central receiver or tower with a heliostat field, wherein the tower is used as a natural-draught cooling tower. This plant will enable a reduction in both internal electricity consumption and water consumption, in such a manner that it can be installed in arid regions, such as deserts, which are highly favourable areas for solar energy due to their high number of daylight hours but where, up until now, installation had been impossible due to their limited water resources.

The solar plant of the invention proposes, for cooling thereof, a tower surrounded by a heliostat field with several solar receiver devices installed on its highest part thereof.

These can be saturated and/or superheated steam receiver devices. The steam originating therein is pumped towards a turbine for producing electricity.

The steam originating in the turbine and which is still very hot must be condensed and pumped towards the receiver devices in order to be re-used as a heat-transfer fluid.

In order to cool this steam, a system has been devised whereby the two previously described drawbacks are overcome: the high electricity consumption (due to the use of fans) and the large amount of water required.

Due to the fact that the solar plant has several receiver devices installed at great height on a tower, without need for extra investment, our system already has the tower, which could be leveraged as a natural-draught cooling tower. Said tower has a series of heat exchangers, more specifically condensers, at its base, which are in charge of condensing the steam coming from the turbine exhaust under near-saturation conditions and evacuating the condensation heat towards the exterior.

The fluid used to carry out this heat exchange shall be air at the ambient temperature found at the base of the tower, which cools the steam circulating through the condenser tube; i.e. the steam originating in the turbine at high temperature is cooled by the air current flowing through the condenser.

Said steam, once condensed, is pumped back towards the receiver device in order to be re-used as a heat-transfer fluid.

The air at ambient temperature at the base of the tower, which is responsible for lowering steam temperature, rises above the tower due to its natural draught and exits through the highest part thereof.

This natural circulation is also aided by the existence of a heat source such as the receiver devices on the highest part of the tower.

Additionally, in order to facilitate the aforementioned natural-draught effect, the tower of the invention under discussion has a hyperbolic and hollow structural design, in such a manner that an ascendant air current flows therethrough to cool the steam by natural convection.

Using the solar tower as a cooling tower, it is given a dual function: that of accommodating the receiver devices at the necessary height for concentrating the radiation and use as a cooling tower.

This allows a reduction in water consumption on eliminating the water required for the cooling circuit, as cooling is based on air and not water, thereby avoiding the construction of additional cooling towers and reducing the overall cost.

Additionally, in order to manage the steam produced and ensure availability thereof in the absence of daylight hours, the plant includes a storage system based on water/steam tanks or molten salts.

DESCRIPTION OF THE DRAWINGS

In order to complete the description being made and with the object of helping to better understand the invention, it is accompanied by a set of drawings wherein, in an illustrative and non-limiting manner, the following have been represented:

FIG. 1 shows a simplified schematic view of the cooling circuit.

The references used herein correspond to:
(1) Tower
(2) Evaporators
(3) Drum
(4) Superheater
(5) Storage system
(6) Turbine
(7) Generator
(8) Condenser
(9) Hot air
(10) Condensate pump
(11) Valve
(11') Valve
(12) Condensate storage tank
(13) Condensate pump

PREFERRED EMBODIMENT OF THE INVENTION

In order to better understand the cooling method disclosed in the invention, a description of the diagram shown in FIG. 1 is provided below.

As can be observed in FIG. 1, the evaporators (2) wherethrough water or any other heat-transfer fluid circulates are disposed on the highest part of the tower (1). This fluid is heated by the solar radiation reflected thereupon by the heliostats, which are located on the ground around the tower (1). Once the heat-transfer fluid has flown through the evaporator (2) subjected to solar radiation, it flows out therefrom in the form of saturated steam at a temperature of approximately 300° C. towards the drum (3).

Separation into liquid and steam takes place inside the drum (3). In general, the drum (3) receives the saturated steam that flows out of the evaporator (2) and feeds the superheater (4), thereby ensuring that it is always dry upon entering the superheater (4).

Another part of the steam produced therein is pumped towards the storage system (5), making it pass through a valve (11) which ensures that it flows into said system (5) with the right amount of pressure.

The steam which has entered the superheater (4) also receives solar radiation reflected by the heliostats and exits at a very high temperature of approximately 540° C., allowing the turbine (6) to work at full capacity.

In turn, the turbine (6) is connected to the generator (7), which shall be responsible for transforming turbine (6) rotation into electricity to be fed to the grid.

In order to leverage the steam that exits the turbine (6), it is made to circulate through the conduits of a condenser (8) installed in the base of the solar tower (1).

The steam will cool and condense at the same time due to the cooling effect of the air circulating around the condenser (8). The temperature of said air, which is air at ambient temperature, rises on absorbing heat from the condenser (8) tubes and becomes hot air (9), whereupon it travels up through the solar chimney or tower (1) and is discharged to the atmosphere through the highest part thereof.

Meanwhile, the already condensed steam that exits the condenser (8) is pumped (10) towards a condensate storage tank (12).

When additional heat-transfer fluid is required in the evaporators (2), a condensate pump (13) pushes the liquid stored inside the condensate tank (12) towards these.

Therefore, consumption of water or heat-transfer fluid decreases dramatically due both to re-use thereof and to dispensing with the use of water for the cooling system.

It must be highlighted that the foregoing description is an example of a preferred embodiment of the invention, but there are aspects such as the existence of superheated steam receiver devices or a storage system which could be dispensable and have no influence on the disclosed cooling method.

The invention claimed is:
1. A method for natural-draught cooling of a solar concentration plant, comprising:

circulating a heat-transfer fluid through an evaporator located at a highest part of a solar tower;

heating the heat-transfer fluid by reflecting solar radiation on to the evaporator with heliostats, and to produce saturated steam;

circulating the saturated steam from the evaporator through a drum, and separating liquid from the saturated steam;

circulating the steam from the drum to a superheater, and increasing the temperature of the steam by reflecting solar radiation reflected on the superheater with the heliostats;

circulating the steam from the superheater through a turbine, connected to a generator and producing electricity with the turbine;

circulating the steam from the turbine through conduits of a condenser installed in a base of the solar tower;

cooling and condensing the steam from the turbine with the condenser using ambient air flowing through the condenser and condensing the steam, the temperature of said air rising upon absorbing heat by said air from the condenser and becoming heated air;

flowing said heated air up from the condenser and through the tower towards the evaporator and the superheater in the solar tower, further heating said air with heat from the evaporator and the superheater; and discharging said heated air from the solar tower to the atmosphere through the highest part of the solar tower.

2. The method for natural-draught cooling of a solar concentration plant according to claim 1, further comprising:

pumping a portion of the steam from the drum to a storage system, and passing the steam through a valve for regulating pressure at a storage system entrance.

3. The method for natural-draught cooling of a solar concentration plant according to claim 1, further comprising:

pumping the condensed heat-transfer fluid from the condenser towards a condensate storage tank; and raising the condensed heat-transfer fluid stored in the condensate storage tank towards the evaporator by a tank pump when additional heat-transfer fluid is required in the evaporator.

4. A solar concentration plant, comprising:

a solar tower including:

an evaporator located at a highest part of the solar tower, said evaporator configured to allow circulation, and heating of a heat-transfer fluid at into saturated steam, a drum downstream from the evaporator configured to separate liquid from the saturated steam in the heat-transfer fluid coming from the evaporator, said drum having a first exit for the liquid and a second exit for steam, and a superheater located at a highest part of the solar tower, said superheater located downstream from the second exit of the drum and configured to allow circulation of the steam from the drum and increase the temperature of the steam from the drum;

a plurality of heliostats directed to:

the evaporator to heat by solar radiation the heat-transfer fluid circulating through the evaporator, and the superheater to heat by solar radiation the steam circulating through the superheater;

a turbine downstream from the superheater, said turbine configured to be moved by the steam from the superheater; and a condenser downstream from the turbine installed in a base of the solar tower, wherein the solar tower further includes a heated air flow path from the condenser towards the evaporator mad the superheater, the heated air flow path including an outlet for discharging heated air from the solar tower to the atmosphere through the highest part of the solar tower, the condenser including a plurality of conduits configured to allow circulation of steam from the turbine, the condenser configured to cool and condense the steam from the turbine is cooled and condensed due to a cooling effect of ambient air and flowing through the condenser to condense the heat-transfer fluid, wherein the temperature of said ambient air, is increased by absorption of heat from the condenser conduits such that the to become heated air, flowing up through the heated air flow path of the solar tower from the base of the solar tower towards the evaporator and the superheater, wherein the heated air is discharged from the solar tower to the atmosphere, and wherein the heated air is further heated by heat of the evaporator and the superheater, the flow of said heated air rising through the heated air flow path of the solar tower after extending a cooling effect to the condenser.

5. The solar concentration plant of claim 4, further comprising:

a condensate storage tank to store condensed heat-transfer fluid;

a condenser pump to pump the condensed heat-transfer fluid from the condenser to the condensate storage tank; and a tank pump to pump the condensed heat-transfer fluid from the condensate storage tank to the evaporator.

* * * * *